United States Patent [19]

Helbling

[11] Patent Number: 4,857,566
[45] Date of Patent: Aug. 15, 1989

[54] CURABLE LATEX COMPOSITION, FILMS AND FOAMS FORMED THEREFROM AND METHOD FOR CURING THE COMPOSITION

[75] Inventor: Alois Helbling, Pialba, Australia

[73] Assignee: The Dow Chemical Company, Midland, Mich.

[21] Appl. No.: 137,984

[22] Filed: Dec. 28, 1987

Related U.S. Application Data

[63] Continuation-in-part of Ser. No. 40,975, Apr. 21, 1987, abandoned.

[51] Int. Cl.$^4$ .................. C08L 33/02; C08L 63/00
[52] U.S. Cl. ..................... 523/409; 523/411; 523/412; 521/69; 521/135
[58] Field of Search ............ 523/409, 411, 412, 408, 523/410; 521/69, 135

[56] References Cited

U.S. PATENT DOCUMENTS

| | | | |
|---|---|---|---|
| Re. 25,880 | 12/1965 | Cline | 523/412 |
| 2,954,358 | 9/1960 | Hurwitz | 523/409 |
| 3,943,187 | 3/1976 | Wu | 523/412 |
| 4,304,701 | 12/1981 | Das | 523/408 |
| 4,442,246 | 4/1984 | Brown | 523/412 |
| 4,446,260 | 5/1984 | Woods | 523/409 |
| 4,458,040 | 7/1984 | Suzuki | 523/409 |
| 4,539,348 | 9/1985 | Gajria | 523/409 |
| 4,619,952 | 10/1986 | Hart | 523/409 |

Primary Examiner—C. Warren Ivy

[57] ABSTRACT

This invention relates to a curable latex composition, films and foams produced therefrom and method for preparing said curable latex composition. The composition comprises a carboxylated latex, an epoxy resin emulsion containing an organo-soluble or organo-miscible catalyst and a water-soluble catalytic curing agent. The carboxylated latex comprises a copolymer of from 0 to 75 percent by weight of a vinyl aromatic monomer, from 0 to 85 percent by weight of a diene monomer and from 0.5 to 25 percent by weight of an ethylentically unsaturated carboxylic acid monomer, all weight percentages based on the total weight of the copolymer. The latex is produced by emulsion polymerization of one or more monomers in an aqueous environment. The various components of the curable latex composition may be maintained separately until shortly before use because of their ambient temperature curing properties. In some instances two or more components which do not react with each other can be premixed. The present curable latex composition has improved shelf life, cures fast at relatively low temperature and provides plastic films or foams with improved moisture resistance and other physical properties. This composition is suitable for use as latex foam backing of textiles, textile and lamination adhesive and synthetic carpet grass coating.

17 Claims, No Drawings

CURABLE LATEX COMPOSITION, FILMS AND FOAMS FORMED THEREFROM AND METHOD FOR CURING THE COMPOSITION

CROSS-REFERENCE TO RELATED APPLICATION

This is a continuation-in-part of copending U.S. application Ser. No. 040,975, filed Apr. 21, 1987, now abandoned.

The present invention relates to a curable latex composition, films and foams formed therefrom and a method of curing said curable latex composition. The term "latex" is defined as a polymer or copolymer prepared from one or more monomers in an aqueous environment by emulsion polymerization techniques.

It is known in the prior art that usefully polymeric films may be formed from carboxylated latex compositions which have been subjected to a crosslinking step. Carboxylated latexes and their methods of preparation are generally taught in the art. The carboxylation is introduced by utilizing as one of the comonomers in the preparation of the latex an unsaturated carboxylic acid monomer. Numerous crosslinking methods have been tried in the formation of such films. For example, the reaction between an available epoxy group and the carboxylic group on the latex is taught in U.S. Pat. No. 4,028,294. As described in this patent, a self-crosslinking latex may be formed by polymerizing epoxy-functional groups into the carboxylic polymer. However such systems have the disadvantages that reaction may take place during the polymerization of the latex and during storage of the polymer dispersion.

In order to prepare polymeric films having improved physical properties and reduced sensitivity to water from an aqueous latex comprising a copolymer of styrene and butadiene containing an unsaturated monocarboxylic or dicarboxylic acid, it has been attempted to crosslink such latex with a post-added emulsion of an epoxy resin. However, there have been difficulties in preparing a stable epoxy resin emulsion. In particular, it is difficult to provide an emulsion having an adequate small particle size for use in crosslinking of the copolymer. Further difficulties relate to the sluggish nature of the reaction mechanism. The reaction requires high temperatures of, for example, greater than 180° C. and also long oven dwell times.

Other attempts have been made to crosslink carboxylated latex films, such as, for example, by utilizing melamine formaldehyde resins and metallic salt complexes and by hydrogen bonding, methylol substitution or ionic crosslinking, but all of these techniques suffer from one or more disadvantages such as sluggish reactivity, poor water resistance, high sensitivity to alkaline aqueous media, release of toxic volatiles during processing, short shelf life of the mixture and moderate crosslinking efficiency.

In view of the aforementioned deficiencies of the known latex compositions, it would be desirable to provide a curable latex composition which cures fast at relatively low temperatures, has improved shelf life, and provide plastic films or foams having improved physical properties and improved moisture resistance. One indication of improved moisture resistance is improved wet strength.

SUMMARY OF THE INVENTION

Accordingly, in a first aspect, the present invention provides a curable latex composition comprising
 (a) a carboxylated latex.
 (b) an epoxy resin emulsion containing an organo-soluble or organo-miscible catalyst and
 (c) a water-soluble catalytic curing agent.

The curable latex composition according to this aspect of the present invention is characterized in that the subsequent curing step may be achieved at relatively low temperatures and relatively short dwell times. The curable latex composition according to this aspect of the present invention further provides a product of improved shelf life, improved physical properties and improved resistance to moisture.

In another aspect, the present invention provides a blend of
 (a) a latex comprising a copolymer of a vinyl aromatic monomer, a diene monomer and an ethylenically unsaturated carboxylic acid monomer as described above, and
 (b) an epoxy resin emulsion as described above and containing an organo-soluble or organo-miscible catalyst.

It has been found that the shelf life for the blend of latex and epoxy resin emulsion is at least several weeks in the absence of the water-soluble catalytic curing agent.

In another aspect, the present invention relates to a process for preparing a curable latex composition which comprises (1) blending (a) a carboxylated latex, (b) an epoxy resin emulsion containing an organo-soluble or organo-miscible catalyst and (c) a water soluble catalytic curing agent.

In a further aspect of the present invention, there is provided a method for preparing a crosslinked latex product which method comprises the steps of
 (A) providing a curable latex composition comprising
 (a) a latex comprising a copolymer of a vinyl aromatic monomer and/or a diene monomer and an ethylenically unsaturated carboxylic acid monomer,
 (b) an epoxy resin emulsion containing an organo-soluble or organo-miscible catalyst, and
 (c) a water-soluble catalytic curing agent and
 (B) heating the curable latex composition at a temperature and for a time sufficient to cure the product.

If the crosslinked latex product to be formed is a film, the method of preparing a latex product may include the further steps of
 (ia) casting a film onto a suitable support and
 (iaa) drying the film so formed.

If the latex product to be formed is a foam product, the method of preparing the latex product comprises the further step of
 (a') subjecting the blend so formed to a foaming step prior to curing.

DETAILED DESCRIPTION OF THE INVENTION

The carboxylated latex comprises a copolymer of a vinyl aromatic monomer and an unsaturated carboxylic acid monomer. In a preferred form, the copolymer may further comprise a diene monomer.

The vinyl aromatic monomer may be selected from styrene, α-methylstyrene, a,r-methylstyrene, a,r-ethylstyrene, α-a,r-dimethylstyrene, a,r,a,r-dimethylstyrene, a,r-t-butylstyrene, vinylnaphthalene, methoxystyrene, cyanostyrene, acetylstyrene, monochlorostyrene, dichlorostyrene, and other halostyrenes, and mixtures thereof. The vinyl aromatic monomer may be present in any effective amount. The vinyl aromatic monomer may be present in amounts of from approximately 0 to 75 percent by weight, based on the total weight of the polymer resin. Preferably the vinyl aromatic monomer is present in amounts of from approximately 35 to 70 percent by weight.

The ethylenically unsaturated carboxylic acid may be a monocarboxylic acid, or a dicarboxylic acid or a polycarboxylic acid, such as, for example, acrylic acid, methacrylic acid, fumaric acid, maleic acid, itaconic acid, derivatives thereof and mixtures thereof.

The ethylenically unsaturated carboxylic acid monomer may be present in amounts of from approximately 0.5 to 25 percent by weight, based on the total weight of the polymeric resin. Preferably, the ethylenically unsaturated acid monomer is present in amounts of from approximately 1 to 5 percent by weight and, more preferably, from 3 to 5 percent by weight, based on the total weight of the copolymer.

The diene monomer, when present, may be selected from butadiene, isoprene, divinylbenzene, derivatives thereof and mixtures thereof. The 1,3-butadiene monomer is preferred. The diene monomer may be present in amounts of from approximately 0 to 85 percent by weight, preferably from approximately 30 to 65 percent by weight, based on the total weight of the polymer resin.

The latex may comprise an additional ethylenically unsaturated monomeric component or components. Specific examples of such ethylenically unsaturated compounds include methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl-chloroacrylate, diethyl maleate, polyglycol maleate, vinyl chloride, vinyl bromide, vinylidene chloride, vinylidene bromide, vinyl methyl ketone, methyl isopropenyl ketone and vinyl ethylester. Derivatives thereof or mixtures thereof may be included.

The latex may comprise a styrene/butadiene/-acrylic acid copolymer or a styrene/butadiene/hydroxyethylacrylate/itaconic acid copolymer. The latex may also include a mixture of copolymers. A mixture of styrene/butadiene/acrylic acid and styrene/butadiene/-hydroxyethylacrylate/itaconic acid polymers in approximately equal amounts by weight may be used.

Such monomers are copolymerized in an aqueous emulsion containing surfactants and modifiers under conditions of time, temperature, pressure and agitation in accordance with well known principles of emulsion polymerization.

The latex component of the curable latex composition may further include an emulsifier or surfactant.

The surfactants used are conventional nonionic and/or anionic surface active agents. Suitable nonionic surfactants include the ethylene oxide derivatives of alkylphenols, such as octyl or nonylphenol containing from 10 to 60 moles of ethylene oxide per mole of the phenol, and long chain alcohols, such as dodecyl alcohol containing the same proportion of ethylene oxide. Suitable anionic surfactants include alkyl sulfates, such as lauryl sulfates, and diverse sulfonates, such as the esters of sulfonated dicarboxylic acids, especially succinic acid. The ethoxylated nonionic surfactants are preferred.

The emulsifier or surfactant may be present in amounts of from approximately 0.5 to 5 percent by weight, based on the dry weight of the copolymer.

It has been found that the inclusion of an emulsifier or surfactant may improve the shelf life of the curable coating composition according to the present invention.

The epoxy resin component is suitably any compound which possesses more than one 1,2-epoxy group. In general, the epoxy resin component is saturated or unsaturated aliphatic or cycloaliphatic, aromatic or heterocyclic and can be substituted or unsubstituted. The epoxy resins may be selected from the polyglycidyl ethers of bisphenol compounds, the polyglycidyl ethers of a novolac resin, and the polyglycidyl ethers of a polyglycol. Mixtures of two or more epoxy resins may also be used.

The preferred epoxy resins are the polyglycidyl ethers of bisphenol compounds. The polyglycidyl ethers of bisphenol A or bisphenol F have been found to be suitable. The epoxy resins may be formed as the reaction products of epichlorohydrin and bisphenol A or bisphenol F or derivatives thereof.

The epoxy resin component of the curable latex composition may further include an emulsifier or surfactant. An anionic or a nonionic surfactant may be used. A nonionic surfactant is preferred. An ethoxylated nonionic surfactant is more preferred. An ethoxylated nonionic surfactant having an HLB of approximately 16 to 20 is most preferred. The non-ionic surfactant sold under the trade designation "Capcure 65" and available from Diamond Shamrock Corporation has been found to be suitable. The emulsifying agent or surfactant may be present in amounts of from approximately 5 to 10 percent by weight, based on the weight of the epoxy resin. Preferably, the emulsifying agent or surfactant is present in amounts of from approximately at least 8 percent by weight. It has been found that where a non-ionic surfactant or emulsifying agent is included, the epoxy resin emulsion so formed provides a relatively reduced particle size. The reduced particle size provides an improvement in the stability of the epoxy resin and in turn in the curable latex composition.

Desirably, in the preparation of the epoxy resin emulsion, the epoxy resin and surfactant or emulsifier are homogenized by means of a suitable high shear blender. The particle size of the epoxy resin emulsion thus produced may be approximately two to five times that of the latex (for example approximately three times that of the latex (for example less than 1000 nm)). High shear homogenization may continue during phase inversion in order to assist in achieving small particle size.

The level of epoxy resin employed will vary over a wide range depending upon the properties of the final product required, as well as the types of epoxy resin and carboxylic acid used.

Low viscosity resins are preferred as it is easier to produce a stable emulsion from them. Most preferred is the epoxy resin sold under the trade designation D.E.R. ® 351-A available from The Dow Chemical Company.

The epoxy resin emulsion component as described above comprises an organo-soluble or organo-miscible catalyst. Suitable organo-soluble or organo-miscible catalysts include the phosphonium salts, such as, for example, ethyltriphenyl phosphonium acetate and ethyltriphenyl phosphonium phosphate and the quaternary ammonium salts, such as, for example, alkylbenzyl dimethyl ammonium chloride, benzyltrimethyl ammonium chloride, methyltrioctyl ammonium chloride, tetraethyl ammonium bromide, N-dodecyl pyridinium chloride and tetraethyl ammonium iodide. The preferred organo-soluble or organo-miscible catalysts are ethyltriphenyl phosphonium acid acetate, ethyltriphenyl phosphonium phosphate and methyltrioctyl ammonium chloride. Ethyltriphenyl phosphonium phosphate is not readily available but it can be manufactured from ethyltriphenyl phosphonium acetate by reaction with phosphoric acid.

The organo-soluble or organo-miscible catalyst may be present in an amount of from approximately 0.1 to approximately 10.0 percent, preferably from 0.3 to 2.0 percent, by weight, based on the weight of the epoxy resin.

The water-soluble catalytic curing agent may be present in an amount of from approximately 0.1 to approximately 15 percent by weight, based on the weight of the copolymer. Suitable catalytic curing agents include tridimethyl aminomethyl phenol, dimethyl aminomethyl phenol, dicyandiamide, polyamines such as, for example, ethylenediamine, diethylenetriamine, triethylene tetramine, tetraethylene pentamine and isophorone diamine.

The curable latex composition according to the present invention may further include standard compounding ingredients such as, for example, fillers, thickening agents, antioxidants, dispersants, pH modifiers and flame retarding agents.

Fillers, when present, may be selected from metals in powder or filament form, and non-metals such as carbon, silicates, asbestos, titanium dioxide, zinc oxide, calcium carbonate. zinc sulphide, potassium titanate and titanate whiskers, glass flakes, clays, kaolin and glass fibers. The fillers may be present in amounts of from approximately 0 to 80 percent by weight, or higher, based on the total weight of the composition. Where the curable latex composition is to be used in the preparation of a foam, calcium carbonate has been found to be a suitable filler.

If a flame retarding agent is used, suitable agents may include chlorinated and brominated organic compounds and/or inorganic compounds such as antimonytrioxide and phosphorous compounds, such as phosphates and phosphites.

An adjustment of the pH of the mixture of the reactive latex and the coreactive material may be made, if desired, by the addition of usual acidifying or alkalizing agents such as, for example, acetic acid, citric acid, dilute mineral acids, ammonium hydroxide and dilute aqueous solutions of alkali metal hydroxides.

The shelf life of the blend of latex and epoxy resin emulsion may be improved by selecting the pH of the blend such that a substantial proportion of the carboxyl groups on the latex copolymer are protonized. It has been found that if the pH is maintained in the range of approximately 6 to 6.5, extended shelf life may be achieved. The pH may be adjusted in any suitable manner. Addition of an approximate amount of ammonia has been found to be suitable for pH adjustment.

It will be understood that the various components of the curable latex compositions of the present invention may be maintained separately until shortly before use because of their ambient temperature curing properties. In some instances, two or more components which do not react with each other can be premixed. For example, the latex and the water-soluble catalytic curing agent may be provided as one component and the epoxy emulsion containing the organo-soluble or organo-miscible catalyst as the other component. The latex may also be combined with the epoxy emulsion containing the organo-soluble or organo-miscible catalyst and then the water-soluble catalytic curing agent may be added separately immediately prior to use. Once combined, the composition may be used directly or may be further diluted with water depending on the solids level desired for the particular method of application to be employed. The composition is applied in conventional manner, such as, for example, by brushing, spraying and roll coating.

The curing temperature may be any suitable temperature above ambient temperature. Indeed, some curing may occur at ambient temperature, but since the reaction time is extremely slow, such a temperature is impractical.

The preferred temperature range is from approximately 120° to 180° C. The residence time is variable. Factors influencing residence time include temperature, film thickness, water content and the components of the curable coating composition. With temperatures in that range, a total residence time of approximately five to ten minutes has been found to be suitable.

The generality of the invention should not in any way be restricted by theory based on the results of our experiments; however, it can be postulated that the water-soluble catalytic curing agent will to some extent be transferred into the epoxy resin phase upon drying, and promote polymerization of the epoxy resin, as well as carboxyl-epoxy reaction. It also makes the latex more miscible with the epoxy resin. The organic soluble catalyst had shown reasonable activity for the acid-epoxy reaction only, hence resin emulsions precatalyzed with the organo-soluble catalyst yield a long shelf life. The organic soluble catalyst also makes the carboxylated latex polymer more miscible with the epoxy resin. It is therefore reasonable to assume, that the latex particles are crosslinked with a built-in network of homopolymerized epoxy resin.

A film of the latex blend may be cast onto a foil support. A polyester foil support, for example, of the "Mylar" type may be used.

The film thickness is variable but a film of a thickness of from approximately 500 to 1000 micrometers, preferably 750 micrometers has been found to be suitable.

It is preferred that the film is air dried at ambient temperature initially and that drying be completed at elevated temperature. For example, the film may be dried at a temperature of approximately 50° to 70° C. for approximately twenty to thirty minutes. It has been found that the initial air drying avoids shrinkage cracking of the film.

The foaming step may be undertaken in any suitable manner.

A foam or froth may be generated by methods well known in the art, for example by releasing a non-coagulating gas such as nitrogen, or by causing the decomposition of a gas-liberating material to chemically react with an ingredient in the mixture with the liberation of a non-coagulable gas as a reaction product. The mixture of the reactive latex and the coreactive material is also foamed by whipping or by use of apparatus having commercially available foam heads. Known foaming aids, such as sodium lauryl sulfate, or foam stabilizers, such as potassium oleate, may be added if desired.

Preferably, such added materials should be non-reactive with the reactive group in the latex polymer or in the coreactive material and thus the preference may vary with the composition of the mixture. Other soaps, emulsifiers, wetting agents, and surfactants, however, may be used, even though they may be reactive to a limited extent.

The frothed mixture may be poured into molds, spread on a flat tray or belt, or coated onto substrates. For the purpose of this specification, the term "substrate" is defined as any material such as cloth, fabric, leather, wood, glass or metal or any form of backing to which the frothed mixture will adhere when applied and after it is cured.

In a preferred embodiment in which the foam is used as a textile backing, the foam may be applied to the textile prior to drying and curing. A typical froth formed from the continuous foam will have a density in the range of from approximately 200 to 400 grams per liter in its wet state, preferably approximately 350 grams per liter. The foam may be applied to the substrate utilizing a doctor blade.

Once formed, the foam may be dried and cured at a temperature of approximately 110° to 150° C. The drying and curing may be undertaken in a forced air circulation oven. The internal temperature of the oven should be maintained preferably at or above approximately 120° C.

The present invention will now be more fully described with reference to the accompanying examples. It should be understood, however, that the following examples are illustrative only and should not be taken in any way as a restriction on the generality of the invention as described above.

Following is a description of materials and test procedures employed in the examples and comparative examples.

| Materials employed | |
|---|---|
| Epoxy Resin A | a diglycidyl ether of bisphenol A supplied by The Dow Chemical Company |
| Epoxy Resin B | a diglycidyl ether of bisphenol A supplied by The Dow Chemical Company |
| Epoxy Resin C | a 50/50 blend of Epoxy Resin B and Epoxy Resin D |
| Epoxy Resin D | a diglycidyl ether of bisphenol F supplied by The Dow Chemical Company |
| Catalyst A | Ethyl triphenyl phosphonium acid acetate |
| Catalyst B | Ethyl triphenyl phosphonium phosphate |
| Catalyst C | Diethylene triamine |
| Capcure TM 65 | Ethoxylated nonionic surfactant supplied by Diamond Shamrock |
| Latex A | 58 percent styrene/39 percent butadiene/3 percent itaconic acid |
| Latex B | 28 percent Styrene/34 percent butadiene/36 percent vinylidene chloride/2 percent itaconic acid |
| Latex C | A copolymer of 32 weight percent styrene, 65 weight percent butadiene and 3 weight percent acrylic acid supplied by The Dow Chemical Company |
| Latex D | A carboxylated styrene/butadiene latex supplied by Dow Chemical (Australia) Ltd. |
| Catalyst D | Tridimethyl aminomethyl phenol supplied by Rhom & Haas |
| Antioxidant A | 2'2'-methylene-bis[6-(methylcyclohexyl)-para-cresol)] |
| Poly Resin 55B | A polyacrylate thickener (9 percent solids) supplied by Revertex Industries (Australia) |
| Lankropol ODS/LS | N—octadecyl sulphosuccinamate supplied by Diamond Shamrock |
| Calgon TM T | A polyphosphate dispersant supplied by Albright and Wilson Company |
| Mobilcer TM RV | A paraffin wax emulsion supplied by Mobil Oil Company |
| Irgalite TM SPV-1 | A carbon black dispersion supplied by Ciba |
| Calcite TM C 75-c | A CaCO3 filler with suitable particle size distribution supplied by A.C.I. Minerals |
| Viscalex TM HV-30 | An acrylic thickener supplied by Allied Colloids LTD. |
| Cassurit TM MT | A melamine formaldehyde resin supplied by Hoechst |
| Dowanol TM PM | A propylene glycol methyl ether supplied by The Dow Chemical Company |
| Surfynol TM EG-75 | A surfactant, tertiary acetylenic glycol in ethylene glycol supplied by Air Products and Chemicals, Inc. |
| Drew Defoamer | A defoamer supplied by Drew Ameroid Australasia Pty. LTD. |
| XZS 86857.00 | An antioxidant dispersion supplied by Dow Chemical Europe |
| Epoxy Resin E | Precatalyzed epoxy resin emulsion supplied by Dow Chemical Australia |
| Catalyst E | Trioctyl methyl ammonium chloride supplied by Henkel Corporation |

Swell and Gel Tests Procedure

Add approximately 0.5 g (weighed accurately) of polymer film to a centrifuge tube. Add 35 cc of tetrahydrofuran (THF). Shake for 1.5 hours. Centrifuge 1 hour at 19,000 rpm. Drain the THF, weigh, dry (minimum of 5 hours) at (65° C.), and reweigh.

Swell Index=Wt of THF imbibed÷Final Dry Weight of Polymer

Percent Gel=100×Final dry weight of polymer÷original film weight

Example 1 Preparation of Organo-Soluble or OrganoMiscible Catalyst

Final Catalyst Composition:
30.0 percent Catalyst B
9.3 percent acetic acid
10.7 percent water
50.0 percent methanol
Procedure:
(1) Charge 1000 grams (70 percent solids) Catalyst A to container.
(2) Mix 193 grams (86.7 percent) phosphoric acid, 210.5 grams water and 804.7 grams methanol together.
(3) While stirring, add mixture to Catalyst A over a five minute period.
(4) Stir for one hour.

It has been discovered that adding water and the mixing of the phosphoric acid, water, and methanol prior to the addition to catalyst A are advantageous in preventing precipitation of the phosphate catalyst with time.

Preparation of Epoxy Resin Emulsion

A fine particle, stable oil-in-water emulsion of epoxy resin is prepared in accordance with the formulation and method outlined below.

Formulation

|  | Parts | |
| --- | --- | --- |
|  | Dry | Wet |
| Epoxy Resin C | 100 | 100 |
| Catalyst B (30%) | 1.5 | 5 |
| Capcure 65 (65%) | 10 | 15.4 |
| Water | — | 79.6 |
|  | 111.5 | 200 |
| Total Solids Content | 55.75% | |
| Epoxy Resin Content | 50.00% | |

Procedure

Ware up epoxy resin to 60° C.
Using an agitator, mix in Catalyst B and Capcure 65
Add water incrementally with high shear mixing
Homogenize mix by means of a suitable homogenizer for at least five minutes

Preparation of A Curable Latex Composition

Using a Dow latex having a polymer composition of styrene/butadiene/acrylic acid in ratio 32/65/3, a blend is prepared in accordance with the following procedure and using the ingredients listed below.

|  | Parts | |
| --- | --- | --- |
| Ingredients | Dry | Wet |
| Latex C | 100 | 177.9 |
| Catalyst D | 1 | 3.3 |
| Antioxidant A | 2.2 | 4.4 |
| Epoxy Resin Emulsion | 11.5 | 20 |
| Poly Resin 55B | 0.28 | 2.3 |
| Ammonia | to pH = 9 | |

The ingredients are added with stirring in sequence listed above. The mixture is then filtered through a 100 micron Nylon mesh and centrifuged at 3000 rpm to remove all entrained air.

A film is cast to a wet thickness of 750 micrometers on a "Mylar" polyester foil. To prevent shrinkage cracking, the film is air-dried at 23° C. followed by 10 minutes drying at 65° C. Finally, the film is cured in a forced air circulation oven for 5 minutes at 130° C.

Upon cooling, the film is removed from the substrate and cut into dumbell shaped specimen to test physical properties and is tested on an Instron tensile tester for tensile strength, energy and elongation. The results are shown in Table 1.

TABLE 1

| Properties | Latex Without Epoxy Cure System | Latex With Epoxy Cure System |
| --- | --- | --- |
| Tensile Stength N.cm$^{-2}$ | 2160 | 11030 |

TABLE 1-continued

| Properties | Latex Without Epoxy Cure System | Latex With Epoxy Cure System |
| --- | --- | --- |
| Elongation percent | 457 | 542 |
| Energy J | 0.43 | 1.93 |

Example 2

Preparation of Latex Form

A stable no-gel foam is prepared in accordance with the following formulation and procedure.

Formulation

|  | Parts | |
| --- | --- | --- |
|  | Dry | Wet |
| Latex C | 100 | 178.2 |
| XZS 86854.01 A.0. Dispersion | 2.2 | 4.4 |
| Catalyst D | 0.75 | 2.5 |
| Epoxy Resin C Emulsion | 10 | 18.1 |
| Lankropol ODS/LS | 5 | 14.3 |
| Calgon T | 1 | 3.3 |
| Mobilcer RV | 4 | 8 |
| Irgalite SPV-1 | 0.1 | 0.27 |
| Calcite C 75-c | 180 | 180 |
| Viscalex HV-30 | 0.15 | 1 |
| Ammmonia | to pH specified | |
| Total Solids Content | 73.9% | |
| pH | 8.9 | |

The ingredients are mixed with agitation in sequence as listed above.

The mixture is passed through a continuous foamer and the resulting froth with a density of 350 g.1$^{-1}$ is doctored onto a precoated tufted carpet at a thickness of approximately 3.5 mm. The foam is then dried and cured to a lowest internal temperature of 120° C. in a forced air circulation oven.

After cooling and conditioning at 23° C./50 percent r.h., the foam is sliced off the carpet and the physical properties are measured. The results are shown below.

| Properties | |
| --- | --- |
| Foam dry density | 0.243 g.cm$^{-3}$ |
| Tensile strength | 10.5 N.cm$^{-2}$ |
| Elongation | 185 % |
| Delamination Strength | 6.2 N.2.5 cm$^{-1}$ |
| Gauge Retention unaged/aged (at 240 g.1$^{-1}$ wet density) | 103/92.8 % |

Example 3

And Comparative Examples A and B

For purposes of demonstrating the superiority of the products of the present invention to the products made with known latexes, a latex with a polymer composition of styrene butadiene/acrylic acid in ratio 32/65/3 is reacted with various crosslinkers and physical properties of the films cured at 135° C. for 10 minutes were determined before and after hot water treatment. The results are shown in Table 2. The film formed in Example 3 is prepared in a similar manner to Example 1.

TABLE 2

| Properties | Comparative Example A (Typical melamine formaldehyde resin) Methylated Melamine Resin (Cassurit MT) 5 phls | Example 3 Epoxy Resin A Emulsion 2% Catalyst A 5 phls | Comparative Example B (Typical Ionic Crosslinking Complex) Zirconium Ammonium Carbonate (Bacote 20) 4 phls |
|---|---|---|---|
| Tensile N.cm$^{-2}$ | 306/257* | 465/452 | 376/350 |
| Elongation % | 472/416 | 694/642 | 593/490 |
| Energy Ncm.cm$^{-3}$ | 962/730 | 1423/1292 | 1244/1015 |
| Tensile Modulus N.cm$^{-2}$ | 1063/743 | 133/159 | 268/273 |

*5 minutes in boiling water, re-dried at 110° C.

Examples 4 to 9 and Comparative Examples C, D and E

Further experiments are carried out to optimize catalyst levels and demonstrate the synergistic effect of the two-catalyst system. The results are shown in Table 3. Catalyst B levels 0.5/1.0/1.5 parts per 100 parts Epoxy Resin C Catalyst D levels 0/5/10 parts per 100 parts Epoxy Resin C Latex Styrene/Butadiene/Acrylic Acid 32/65/3.

TABLE 3

|  | Comp. Example C | Comp. Example D | Comp. Example E | Example 4 | Example 5 |
|---|---|---|---|---|---|
| Catalyst B | 0.5 | 1.0 | 1.5 | 0.5 | 1.0 |
| Catalyst D | 0 | 0 | 0 | 5 | 5 |
| Tensile N.cm$^{-2}$ | 2766 | 3136 | 2960 | 5110 | 6620 |
| Elongation % | 606 | 622 | 610 | 523 | 635 |
| Energy J | 0.64 | 0.73 | 0.63 | 0.91 | 1.42 |

|  | Example 6 | Example 7 | Example 8 | Example 9 |
|---|---|---|---|---|
| Catalyst B | 1.5 | 0.5 | 1.0 | 1.5 |
| Catalyst D | 5 | 10 | 10 | 10 |
| Tensile N.cm$^{-2}$ | 5190 | 6600 | 7680 | 11030 |
| Elongation % | 567 | 402 | 461 | 542 |
| Energy J | 0.98 | 1.00 | 1.38 | 1.93 |

Curing conditions: 5 minutes at 130° C.

Example 10

Other two-catalyst systems are evaluated as in Example 4. The results of these tests show that Catalyst E can be substituted for Catalyst A and obtain equivalent tensile properties. The results also show that Catalyst C can be substituted for Catalyst D.

Example 11

Effect of Dual Catalyst System on Crosslinking Efficiency of Epoxy Resin

In this example, several carboxylated latexes containing either a single catalyst or a combination of two catalysts and up to 10 percent by weight of epoxy resin emulsion are evaluated to determine the effect of a dual catalyst system on the crosslinking efficiency of the epoxy resin.

The swell and gel data shown in Table 4 indicate that crosslinking indeed occurs in the curable latex composition of the present invention. As more epoxy resin was added to either Latex A or Latex B, the swelling index decreases and the percent gel increases, both indicating increased crosslinking. The data in Table 5 show the effect on Latex B polymer swell and gel, of adding epoxy with no catalyst, or the single catalyst, Catalyst E. With no catalyst, no significant change in the swell index or percent gel is seen, indicating little crosslinking. Addition of 6 percent Catalyst E but only with room temperature drying also results in no significant crosslinking. With the use of 6 percent Catalyst E with 10 minute cure at 130° C., some decrease in the swell index and increase in percent gel is seen indicating crosslinking. However, the magnitude of the change was not as great as in the case of the dual catalyst system.

TABLE 4

Effect of Dual Catalyst as Indicated by Swell Index and Percent Gel

| Latex | Parts Resin C | Swell Index | Percent Gel |
|---|---|---|---|
| A | 0 | 8.6 | 73 |
| A | 3 | 7.4 | 77 |
| A | 6 | 6.8 | 81 |
| A | 10 | 5.6 | 80 |
| B | 0 | 16.3 | 59 |
| B | 3 | 13.4 | 67 |
| B | 6 | 9.4 | 71 |
| B | 10 | 8.0 | 73 |

TABLE 5

Effect of Catalyst and Cure as Indicated by Percent Gel and Swell Index

| Latex | Parts Epoxy/Resin B | Catalyst/E | Cured | Swell Index | Percent Gel |
|---|---|---|---|---|---|
| B | 0 | None | Yes | 10.0 | 76 |
| B | 3 | None | Yes | 9.7 | 78 |
| B | 6 | None | Yes | 9.8 | 79 |
| B | 3 | 6% | Yes | 8.9 | 81 |
| B | 6 | 6% | Yes | 8.8 | 83 |
| B | 0 | None | No | 8.3 | 79 |
| B | 3 | 6% | No | 8.2 | 77 |
| B | 6 | 6% | No | 8.7 | 77 |

Example 12

A latex compound containing a catalyst combination and an epoxy resin emulsion as well as an inorganic filler as listed below is prepared as in Example 2 and is used as the backing material for "Synthetic turf" which is essentially a tufted floor covering made from polypropylene fibers.

The latex compound is applied to the carpet in a conventional lick roll/pan situation and dried and cured in a forced air circulated dryer or by means of heat radiators e.g. electric or gas infrared.

The adequately cured backing exhibits a high initial tuft lock and little or no loss in physical properties after rigorous water treatment, which indicates very good moisture resistance.

| Formulation: | Parts | |
|---|---|---|
| | Dry | Wet |
| Latex D | 100 | 200 |
| Dowanol PM | — | 2.5 |
| Surfynol EG-75 | 0.5 | 0.67 |
| Drew Defoamer | 0.05 | 0.1 |
| Irgalite SPV-1 | 0.8 | 2.2 |
| XZS 86857.00 | 1.5 | 3.0 |
| Ammonia (28%) | — | 0.8 |
| Catalyst D (30%) | 0.3 | 1.0 |
| Calcite C 75-c | 70 | 70 |
| Fly Ash | 20 | 20 |
| Epoxy Resin E | 3 | 5.45 |
| Viscalex HV-30 (15%) | 0.65 | 4.3 |
| Total Solids Content | 62–64% | |
| Viscosity | *6.000–8000 | mPa.S |
| pH | 8–9 | |

Test Results

Coating Weight: 401 g.m$^{-2}$ dry
Initial Tuft retention: 36.7 N*
After water treatment**: 41.7 N

* Tested in accordance with AS 2111.15, mean of 20 pulls
** Subjected to boiling water for 2 minutes, subsequent drying at 40° C.

Finally, it is to be understood that various other modifications and/or alterations may be made without departing from the spirit of the present invention as outlined herein.

What is claimed is:

1. A curable latex composition comprising
   (a) a carboxylated latex comprising a copolymer of a vinyl aromatic monomer, a diene monomer and an ethylenically unsaturated carboxylic acid monomer,
   (b) an epoxy resin emulsion comprising an epoxy resin having more than one 1,2-epoxy group, said emulsion additionally comprising a first catalyst selected from the group consisting of ethyltriphenyl phosphonium acetate, ethyltriphenyh phosphonium phosphate, methyltrioctyl ammonium chloride, alkybenzyl dimethyl ammonium chloride, benzyl trimethyl ammonium chloride, tetraethyl ammonium bromide, N-dodecyl pyridinium chloride and tetrabutyl ammonium iodine and
   (c) a second catalyst selected from the group consisting of tridimethylaminomethyl phenol, dimethyl aminomethyl phenol, dicyandiamide, ethylenediamine, diethylenetriamine, triethylene tetramine, tetraethylene pentamine and isophorone diamine.

2. A curable latex composition as claimed in claim 1, wherein the copolymer of said carboxylated latex comprises the vinyl aromatic monomer in an amount of from zero to 75 percent by weight, the diene monomer in an amount of from zero to 85 percent by weight and the ethylenically unsaturated carboxylic acid monomer in an amount of from 0.5 to 25 percent by weight, all weight percentages based on the total weight of the copolymer.

3. A curable latex composition as claimed in claim 1 wherein the copolymer of said carboxylated latex further comprises a monomer selected from the group consisting of methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl-chloroacrylate, diethyl maleate, polyglycol maleate, vinyl chloride, vinyl bromide, vinylidene chloride, vinylidene bromide, vinyl methyl ketone, methyl isopropenyl ketone and vinyl ethyl ester.

4. A curable latex composition as claimed in claim 2 wherein said carboxylated latex further comprises a surfactant.

5. A curable latex composition as claimed in claim 4 wherein said surfactant is an ethoxylated nonionic surfactant.

6. A curable latex composition as claimed in claim 4 wherein said surfactant is present in an amount of from 0.5 percent to 5 percent by weight, based on the dry weight of the copolymer.

7. A curable latex composition as claimed in claim 1 wherein said epoxy resin emulsion comprises a surfactant.

8. A curable latex composition as claimed in claim 7 wherein said surfactant is an ethoxylated nonionic surfactant.

9. A curable latex composition as claimed in claim 7 wherein said ethoxylated nonionic surfactant has an HLB of from 16 to 20.

10. A curable latex composition as claimed in claim 7 wherein said surfactant is present in an amount of from 5 to 10 percent by weight, based on the weight of the epoxy resin.

11. A curable latex composition as claimed in claim 1 wherein (1) said vinyl aromatic monomer is selected from the group consisting of styrene, methylstyrene, ethylstyrene, dimethylstyrene, t-butylstyrene, vinylnaphthalene, methoxystyrene, cyanostyrene, acetylstyrene, monochlorostyrene and mixtures thereof, (2) said diene monomer is selected from the group consisting of butadiene, isoprene, divinylbenzene, and mixtures thereof, and (3) said ethylenically unsaturated carboxylic acid is selected from the group consisting of acrylic acid, methacrylic acid, fur maric acid, maleic acid, itaconic acid and mixtures thereof.

12. A curable latex composition as claimed in claim 1 wherein said epoxy resin is selected from the polyglycidyl ethers of bisphenol compounds, the polyglycidyl ethers of a novolac resin, the polyglycidyl ethers of a polyglycol and mixtures thereof.

13. A curable latex composition as claimed in claim 12 wherein said epoxy resin is a polyglycidyl ether of bisphenol-A, a polyglycidyl ether of bisphenol-F or mixtures thereof.

14. A curable latex composition as claimed in claim 2 wherein said first catalyst is present in an amount of from 0.1 to 10 percent by weight, based on the weight of the epoxy resin.

15. A curable latex composition as claimed in claim 2 wherein said second catalyst is present in an amount of from 0.1 to 15 percent by weight, based on the weight of the copolymer.

16. A process for preparing a curable latex composition which comprises (a) blending a carboxylated latex comprising a copolymer of a vinyl aromatic monomer, a diene monomer and an ethylenically unsaturated carboxylic acid monomer, (b) an epoxy resin emulsion comprising an epoxy resin having more than one 1,2-epoxy group, said emulsion additionally comprising a first catalyst selected from the group consisting of ethyltriphenyl phosphonium, acetate, ethyltriphenyl phosphonium phosphate, methyltrioctyl ammonium chloride, alkylbenzyl dimethyl ammonium chloride, benzyl trimethyl ammonium chloride, tetraethyl ammonium bromide, N-dodecyl pyridinium chloride and tetrabutyl ammonium iodide and (c) a second catalyst selected from the group consisting of tridimethylaminomethyl phenol, dimethyl aminomethyl phenol, dicyandiamide, ethylenediamine, diethylenetriamine, triethylene tetramine, tetraethylene pentamine and isophorone diamine.

17. A process for preparing a crosslinked latex product which comprises heating the curable latex composition of claim 1 at a temperature and for a time sufficient to cure the product.

* * * * *

UNITED STATES PATENT AND TRADEMARK OFFICE
CERTIFICATE OF CORRECTION

PATENT NO.   : 4,857,566

DATED        : August 15, 1989

INVENTOR(S)  : Alois Helbling

It is certified that error appears in the above-identified patent and that said Letters Patent is hereby corrected as shown below:

Column 5, line 7, "phosphonium acid acetate" should read --phosphonium acetate--; line 35, "carbonate. zinc" should read --carbonate, zinc--.

Column 7, line 20 and 21, "liter" should read --litre--.

Column 9, line 25, "Ware should read --Warm--.

Column 10, line 29, "Ammmonia" should read --Ammonia--.

Column 12, line 54, in Table 5, "Catalyst/E" should read --Catalyst E--.

Column 13, line 51, "ethyltriphenyh" should read --ethyltriphenyl--; line 56, "iodine" should read --iodide--.

Column 14, line 46, "fur maric" should read --fumaric--.

Signed and Sealed this

Fourth Day of June, 1991

Attest:

HARRY F. MANBECK, JR.

*Attesting Officer*    *Commissioner of Patents and Trademarks*